United States Patent
Zhao et al.

(10) Patent No.: US 10,319,104 B2
(45) Date of Patent: Jun. 11, 2019

(54) METHOD AND SYSTEM FOR DETERMINING DATUM PLANE

(71) Applicant: BOE TECHNOLOGY GROUP CO., LTD., Beijing (CN)

(72) Inventors: Jibo Zhao, Beijing (CN); Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 15/525,703

(22) PCT Filed: Jun. 8, 2016

(86) PCT No.: PCT/CN2016/085251
§ 371 (c)(1),
(2) Date: May 10, 2017

(87) PCT Pub. No.: WO2017/152529
PCT Pub. Date: Sep. 14, 2017

(65) Prior Publication Data
US 2018/0075616 A1    Mar. 15, 2018

(30) Foreign Application Priority Data

Mar. 9, 2016 (CN) .......................... 2016 1 0133165

(51) Int. Cl.
*G06K 9/00* (2006.01)
*G06T 7/564* (2017.01)
(Continued)

(52) U.S. Cl.
CPC ............. *G06T 7/564* (2017.01); *G06T 7/12* (2017.01); *G06T 7/13* (2017.01); *G06T 7/162* (2017.01);
(Continued)

(58) Field of Classification Search
CPC ... G06T 7/564; G06T 7/11; G06T 7/13; G06T 7/136; G06T 7/174; G06T 7/194;
(Continued)

(56) References Cited

U.S. PATENT DOCUMENTS

| | | | |
|---|---|---|---|
| 10,008,027 B1 * | 6/2018 | Baker | G06T 15/205 |
| 2007/0024614 A1 * | 2/2007 | Tam | H04N 13/261 |
| | | | 345/419 |

(Continued)

FOREIGN PATENT DOCUMENTS

| | | |
|---|---|---|
| CN | 102075686 A | 5/2011 |
| CN | 102135417 A | 7/2011 |

(Continued)

OTHER PUBLICATIONS

International Search Report dated Nov. 28, 2016 corresponding to application No. PCT/CN2016/085251.

(Continued)

*Primary Examiner* — Jose L Couso
(74) *Attorney, Agent, or Firm* — Nath, Goldberg & Meyer; Joshua B. Goldberg; Stanley N. Protigal

(57) ABSTRACT

A method and a system for determining a datum plane are disclosed. The method for determining a datum plane includes: acquiring a depth image; performing edge extraction on the depth image to form an edge image, the edge image including a plurality of planar graphs; and selecting from the planar graphs in the edge image to determine the datum plane. The technical solutions provided by the disclosure can easily match the virtual object with the real scene in real time, and improve users' sensory experience beyond reality.

8 Claims, 5 Drawing Sheets

(51) Int. Cl.
  *G06T 7/13* (2017.01)
  *G06T 7/60* (2017.01)
  *G06T 7/12* (2017.01)
  *G06T 7/162* (2017.01)

(52) U.S. Cl.
  CPC ...... *G06T 7/60* (2013.01); *G06T 2207/10028* (2013.01); *G06T 2207/20072* (2013.01)

(58) Field of Classification Search
  CPC .... G06T 7/20; G06T 7/60; G06T 7/73; G06T 3/40; G06T 3/0037; G06T 13/00; G06T 13/20; G06T 15/00; G06T 15/20; G06T 15/205; G06T 15/40; G06T 17/00; G06T 17/05; G06T 17/10; G06T 17/20; G06T 17/30; G06T 19/00; G06T 19/003; G06T 19/20; G06T 2200/00; G06T 2200/04; G06T 2200/08; G06T 2207/10012; G06T 2207/10016; G06T 2207/10028; G06T 2207/10076; G06T 2207/10136; G06T 2207/20036; G06T 2207/20044; G06T 2207/20108; G06T 2207/20228; G06T 2207/30196; G06T 2215/00; G06T 2215/06; G06T 2219/00; G06T 2219/20; G06K 9/00375; G06K 9/4604; G06K 2209/40; H04N 13/122; H04N 13/275; H04N 21/8146; H04N 21/816; H04N 2213/003; H04N 2213/005; G01B 11/14; G01B 11/22
  See application file for complete search history.

(56) References Cited

U.S. PATENT DOCUMENTS

| | | | |
|---|---|---|---|
| 2008/0100612 A1* | 5/2008 | Dastmalchi | A61B 3/102 345/418 |
| 2011/0211749 A1 | 9/2011 | Tan et al. | |
| 2013/0113802 A1* | 5/2013 | Weersink | G06T 15/20 345/427 |
| 2014/0064602 A1 | 3/2014 | Li et al. | |
| 2014/0163930 A1* | 6/2014 | Balon | G06F 17/50 703/1 |
| 2015/0049086 A1* | 2/2015 | Morato | G06T 15/04 345/427 |
| 2015/0254891 A1* | 9/2015 | Oka | G06T 17/05 345/420 |
| 2016/0171745 A1* | 6/2016 | Silvennoinen | G06T 15/40 345/423 |
| 2016/0217610 A1* | 7/2016 | Liu | G06T 17/10 |
| 2017/0098125 A1* | 4/2017 | Marty | G06T 7/50 |
| 2017/0124717 A1* | 5/2017 | Baruch | G06T 7/187 |
| 2017/0272704 A1* | 9/2017 | Kato | H04N 7/183 |

FOREIGN PATENT DOCUMENTS

| | | |
|---|---|---|
| CN | 102566827 A | 7/2012 |
| CN | 102901488 A | 1/2013 |
| CN | 103389042 A | 11/2013 |
| CN | 103729850 A | 4/2014 |
| CN | 102667913 B | 3/2015 |
| CN | 104539925 A | 4/2015 |
| CN | 105046710 A | 11/2015 |
| EP | 0633550 A2 | 1/1995 |

OTHER PUBLICATIONS

Written Opinion of the International Searching Authority dated Nov. 28, 2016 corresponding to application No. PCT/CN2016/085251.
First Office Action dated Feb. 5, 2018 corresponding to Chinese application No. 201610133165.5.

* cited by examiner

METHOD AND SYSTEM FOR DETERMINING DATUM PLANE

TECHNICAL FIELD

The present invention relates to the field of display technology, and particularly relates to a method and a system for determining a datum plane.

BACKGROUND

Augmented Reality (AR for short) is a new technology that integrates real-world information with virtual-world information seamlessly. Specifically, AR technology applies virtual information to the real world, so that the real environment and virtual object(s) are superimposed on a same screen or in a same space in real time. Therefore, AR technology not only shows the real-world information but also displays virtual-world information at the same time, the two kinds of information are complemented with and superimposed on each other and perceived by human senses, and thus, people can get sensory experience beyond reality.

In the field of AR, optical see-through AR system has advantages such as being simple, high in resolution, free of visual error, etc. However, when an existing optical see-through AR system fuses a virtual object with a real scene, the angle of lens needs to be adjusted all the time, or a calibration position needs to be set manually, so that the virtual object can be arranged at an appropriate position in the real scene. In this way, the virtual object and the real scene can hardly match in real time, thereby affecting user's experience.

SUMMARY

To solve the above problem, embodiments of the present invention provide a method and a system for determining a datum plane, which can easily match a virtual object with a real scene in real time, improve user's sensory experience beyond reality, and be applicable in a portable apparatus.

One aspect of the present invention provides a method for determining a datum plane, including:

acquiring a depth image;

performing edge extraction on the depth image to form an edge image, the edge image including a plurality of planar graphs; and selecting from the planar graphs in the edge image to determine the datum plane.

Optionally, after the step of selecting from the planar graphs in the edge image to determine the datum plane, the method for determining a datum plane further includes:

forming a datum coordinate system based on the datum plane.

Optionally, the step of performing edge extraction on the depth image to form an edge image includes:

obtaining a gradient change rate of the depth image according to a preset gradient algorithm;

forming a binary image according to the gradient change rate; and performing edge extraction on the binary image to form the edge image.

Optionally, the step of selecting from the planar graphs in the edge image to determine the datum plane includes:

selecting planar graphs each having an image depth value decreasing gradually from bottom to top to form a first planar graph collection; and selecting from the planar graphs in the first planar graph collection to determine the datum plane.

Optionally, the step of selecting from the planar graphs in the first planar graph collection to determine the datum plane includes:

selecting planar graphs each having an area larger than 15% of an area of the edge image to form a second planar graph collection; and selecting from the planar graphs in the second planar graph collection to determine the datum plane.

Optionally, the step of selecting from the planar graphs in the second planar graph collection to determine the datum plane includes:

selecting, from the second planar graph collection, a planar graph whose center point is closest to the bottom of the edge image to be the datum plane.

Optionally, the datum coordinate system includes a first axis, a second axis and a third axis perpendicular to one another, and the step of forming a datum coordinate system based on the datum plane includes:

obtaining coordinates of at least three points in the datum plane; and forming the datum coordinate system based on the coordinates of the at least three points such that the first axis is perpendicular to the datum plane, and the second axis and the third axis are in the datum plane.

Optionally, the step of obtaining coordinates of at least three points in the datum plane includes:

obtaining a maximum square in the datum plane; and obtaining coordinates of four vertices of the maximum square.

Optionally, before the step of forming a datum coordinate system based on the datum plane, the method for determining a datum plane further includes:

selecting from the planar graphs in the edge image to determine a reference plane, the reference plane being parallel to the datum plane; and the step of forming a datum coordinate system based on the datum plane includes:

forming the datum coordinate system based on the datum plane and the reference plane such that an origin of the datum coordinate system is in the reference plane.

Another aspect of the present invention provides a system for determining a datum plane, including:

a first acquisition unit, configured to acquire a depth image;

a first extraction unit, configured to extract an edge of the depth image to form an edge image, the edge image including a plurality of planar graphs; and a first selection unit, configured to select from the planar graphs in the edge image to determine the datum plane.

Optionally, the system for determining a datum plane further includes:

a first formation unit, configured to form a datum coordinate system based on the datum plane.

Optionally, the first extraction unit includes:

a first acquisition module, configured to obtain a gradient change rate of the depth image according to a preset gradient algorithm;

a first formation module, configured to form a binary image according to the gradient change rate; and a first extraction module, configured to extract an edge of the binary image to form the edge image.

Optionally, the first selection unit includes:

a first selection module, configured to select planar graphs each having an image depth value decreasing gradually from bottom to top to form a first planar graph collection; and a second selection module, configured to select from the planar graphs in the first planar graph collection to determine the datum plane.

Optionally, the second selection module includes:

a first selection sub-module, configured to select planar graphs each having an area larger than 15% of an area of the edge image to form a second planar graph collection; and a second selection sub-module, configured to select from the planar graphs in the second planar graph collection to determine the datum plane.

Optionally, the second selection sub-module includes:

a third selection sub-module, configured to select, from the second planar graph collection, a planar graph whose center point is closest to the bottom of the edge image to be the datum plane.

Optionally, the datum coordinate system includes a first axis, a second axis and a third axis perpendicular to one another, and the first formation unit includes:

a second acquisition module, configured to obtain coordinates of at least three points in the datum plane; and a second formation module, configured to form the datum coordinate system based on the coordinates of the at least three points such that the first axis is perpendicular to the datum plane, and the second axis and the third axis are in the datum plane.

Optionally, the second acquisition module includes:

a first acquisition sub-module, configured to obtain a maximum square in the datum plane; and a second acquisition sub-module, configured to obtain coordinates of four vertices of the maximum square.

Optionally, the system for determining a datum plane further includes:

a second selection unit, configured to select from the planar graphs in the edge image to determine a reference plane, the reference plane being parallel to the datum plane; and the first formation unit includes:

a third formation module, configured to form the datum coordinate system based on the datum plane and the reference plane such that an origin of the datum coordinate system is in the reference plane.

The present invention achieves beneficial effects as follows.

In the method and system for determining a datum plane provided by embodiments of the present invention, the method for determining a datum plane includes: acquiring a depth image; performing edge extraction on the depth image to form an edge image, the edge image including a plurality of planar graphs; and selecting from the planar graphs in the edge image to determine the datum plane. Technical solutions provided by the embodiments of the present invention can determine a datum plane in a real scene, so that a virtual coordinate system is built based on the datum plane, and eventually, a virtual object is integrated with a real scene. Therefore, the technical solutions provided by the present invention can easily match the virtual object with the real scene in real time, improve users' sensory experience beyond reality, and be applicable to portable devices such as a wearable lens, etc.

DETAILED DESCRIPTION OF THE EMBODIMENTS

To enable those skilled in the art to better understand technical solutions of the present invention, the method and system for determining a datum plane provided by the present invention will be described in detail below in conjunction with the accompanying drawings.

First Embodiment

Figure 1:
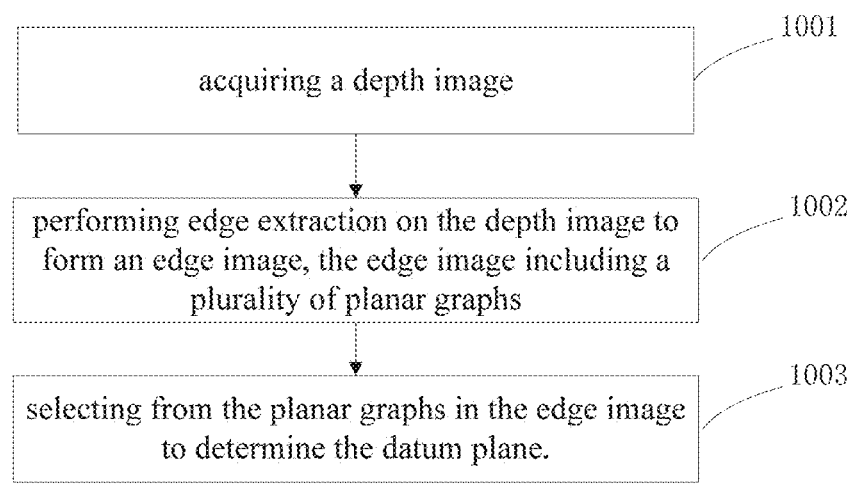
FIG. 1 is a flowchart of a method for determining a datum plane provided by a first embodiment of the present invention.

FIG. 1 is a flowchart of a method for determining a datum plane provided by a first embodiment of the present invention. As shown in FIG. 1, the method for determining a datum plane includes the following steps 1001 to 1003.

Step 1001 includes acquiring a depth image.

Figure 2:
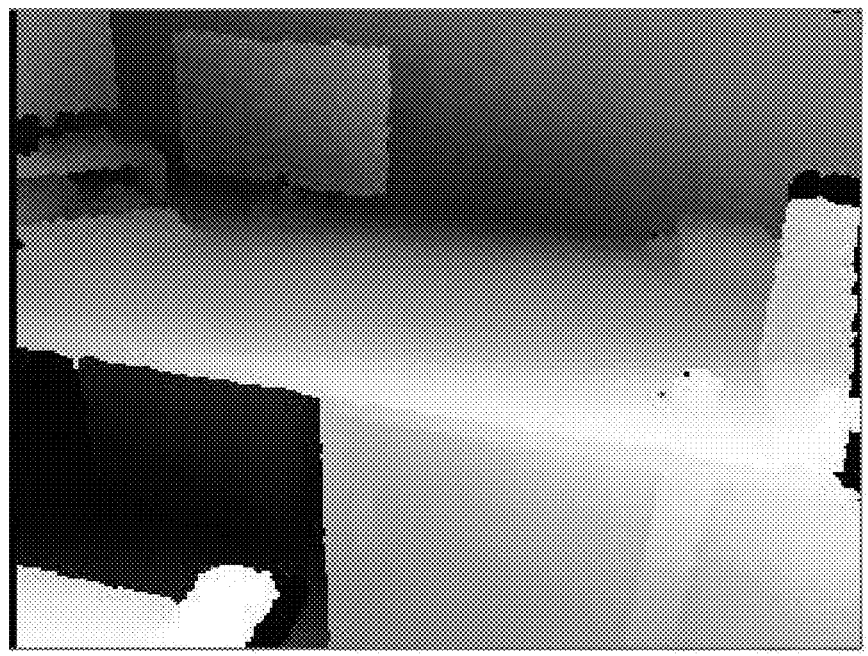
FIG. 2 shows a depth image provided by the first embodiment of the present invention.

FIG. 2 shows a depth image provided by the first embodiment of the present invention. As shown in FIG. 2, in the embodiment, the depth image of an office can be acquired by a depth camera. The depth image in the embodiment may also be referred to as depth of field image.

Step 1002 includes performing edge extraction on the depth image to form an edge image, the edge image including a plurality of planar graphs.

In the embodiment, the step of performing edge extraction on the depth image to form an edge image includes: obtaining a gradient change rate of the depth image according to a preset gradient algorithm; forming a binary image according to the gradient change rate; and performing edge extraction on the binary image to form the edge image.

Figure 3:
FIG. 3 shows a binary image provided by the first embodiment of the present invention.

FIG. 3 shows a binary image provided by the first embodiment of the present invention. Unlike a binary image, edge extraction cannot be performed on a depth image. Therefore, in the embodiment, a depth image is first transformed into a binary image, as shown in FIG. 3, and then edge extraction is performed on the binary image to form an edge image. The binary image refers to an image in which every pixel has only two possible values or gray levels. In a depth image, gradient change of an edge of one plane in a viewing direction is uniform. Therefore, the gradient change rate of the depth image can be calculated according to a preset gradient algorithm such as Sobel algorithm, pixels having a same gradient change rate are set to black and pixels having non-uniform gradient change rates are set to white, thereby forming a binary image.

Figure 4:
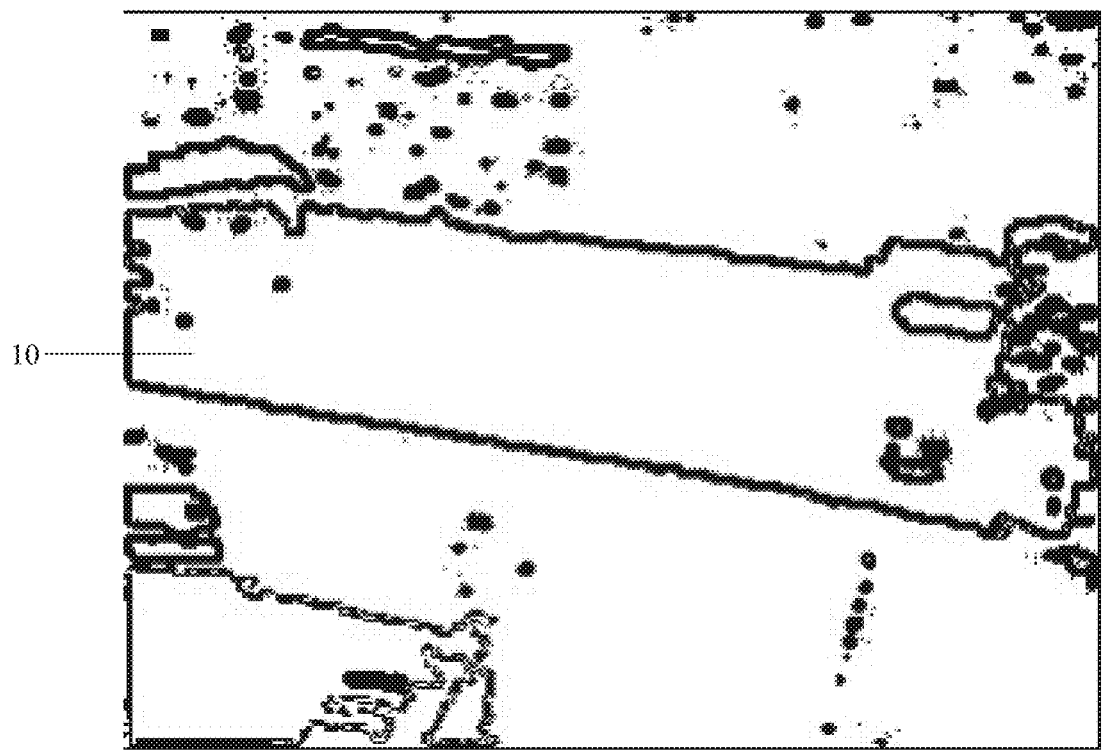
FIG. 4 shows an edge image provided by the first embodiment of the present invention.

FIG. 4 shows an edge image provided by the first embodiment of the present invention. Pixels having a same gradient change rate can be connected to form the edge of a plane graph, and therefore, the edge image can be formed by performing edge extraction on the binary image, as shown in FIG. 4. The edge image includes a plurality of planar graphs.

For example, the planar graph 10 in the middle is formed by an edge contour of a table top.

Step 1003 includes selecting from the planar graphs in the edge image to determine the datum plane.

Figure 5:
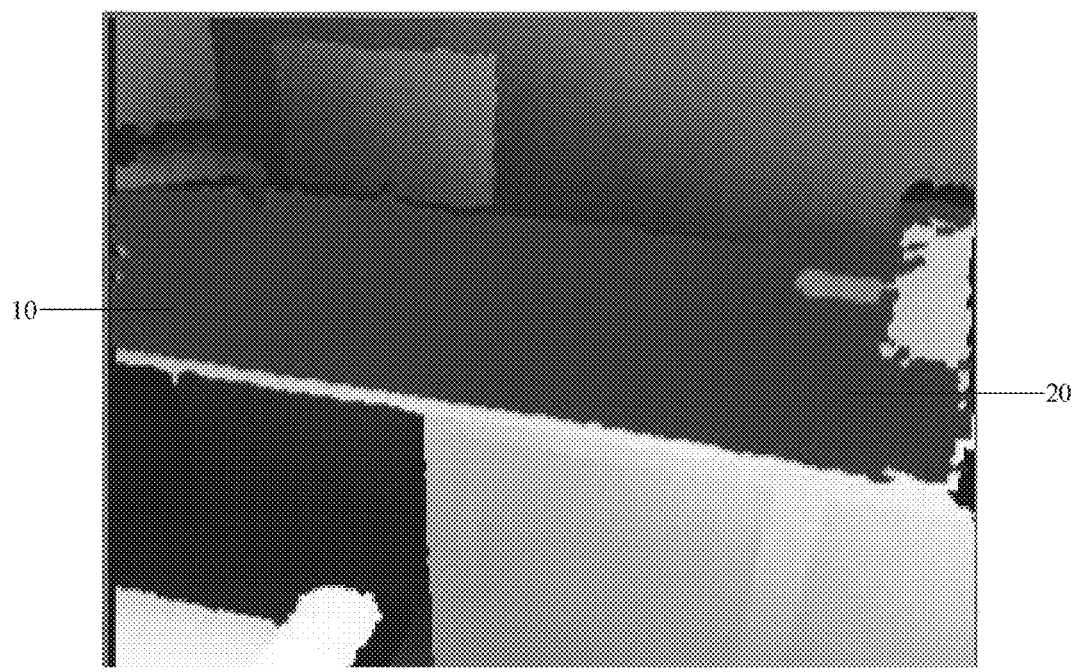
FIG. 5 is a schematic diagram of a datum plane provided by the first embodiment of the present invention.

FIG. 5 is a schematic diagram of a datum plane provided by the first embodiment of the present invention. Hereinafter, how to select from the planar graphs in the edge image to determine the datum plane is described with reference to FIG. 5.

As shown in FIG. 5, the edge image includes a plurality of planar graphs, for example, a desk top (a horizontal plane facing upwards), a ceiling surface (a horizontal plane facing downwards), a wall surface (a vertical plane), a side surface of the desk (a vertical plane), and the like. Required datum planes (e.g., planar graphs of horizontal planes facing upwards) can be selected by using image depth values. The image depth (depth of field) value depends on a device that captures the depth image. In some devices, the farther a distance of an object from a camera of the device, the smaller its image depth value; in some other devices, the farther a distance of an object from a camera of the device, the larger its image depth value; in some other devices, value of a distance of an object from a camera of the device is converted into an image depth value according to certain mapping relationship. In the embodiment, it is assumed that the farther a distance of an object from a camera of the device, the smaller its image depth value. Therefore, gradient change of a planar graph that is a horizontal plane facing upwards decreases gradually from bottom to top in the image (depth value in a user's viewing direction decreases gradually from near to far). For example, the depth value of the desk top in the user's viewing direction evenly decreases from near to far, thereby forming the planar graph 10. In this case, the step of selecting from the planar graphs in the edge image to determine the datum plane may include: selecting planar graphs each having an image depth value decreasing gradually from bottom to top so as to form a first planar graph collection; and selecting from the planar graphs in the first planar graph collection to determine the datum plane. Therefore, by using the gradient change rate of a plane in the embodiment, a plane whose change trend does not satisfy the above requirement, such as a part of ceiling, and a side surface of the desk, can be excluded. Needless to say, in the case of other device where a distance of an object from a camera has a different relationship with the image depth value, a corresponding way of selecting the first planar graph collection can be readily conceived by referring to the above example.

In the embodiment, the largest horizontal plane is chosen as the datum plane for projecting a virtual object. In the embodiment, the step of selecting from the planar graphs in the first planar graph collection to determine the datum plane includes: selecting planar graphs each having an area larger than 15% of an area of the entire edge image to form a second planar graph collection; and selecting from the planar graphs in the second planar graph collection to determine the datum plane. By selecting, as the datum plane, a planar graph whose area is larger than 15% of the area of the entire image, a planar graph whose area is too small can be excluded. For example, the planar graph 10 of the table top has an area larger than 15% of the area of the entire image, and therefore, the planar graph 10 of the table top is selected as the datum plane.

Preferably, the step of selecting from the planar graphs in the second planar graph collection to determine the datum plane includes: selecting, from the second planar graph collection, a planar graph whose center point is closest to the bottom of the edge image to be the datum plane. In a case where a plurality of planar graphs satisfy the above conditions, the planar graph whose edge contour has a central point proximal to the bottom of the entire image in the user's viewing direction can be selected from these planar graphs. In this way, parts of ceiling and wall can be excluded. For example, in the embodiment, the planar graph 10 is selected as the datum plane 20, as shown in FIG. 5.

In the embodiment, the method for determining a datum plane further includes: forming a datum coordinate system based on the datum plane. Optionally, the datum coordinate system includes a first axis, a second axis and a third axis, which are perpendicular to one another, and the step of forming a datum coordinate system based on the datum plane includes: obtaining coordinates of at least three points within the datum plane; and forming the datum coordinate system based on the coordinates of the at least three points such that the first axis is perpendicular to the datum plane, and the second axis and the third axis are in the datum plane. Preferably, the step of obtaining coordinates of at least three points within the datum plane includes: obtaining a maximum square in the datum plane; and obtaining coordinates of four vertices of the maximum square.

Figure 6:
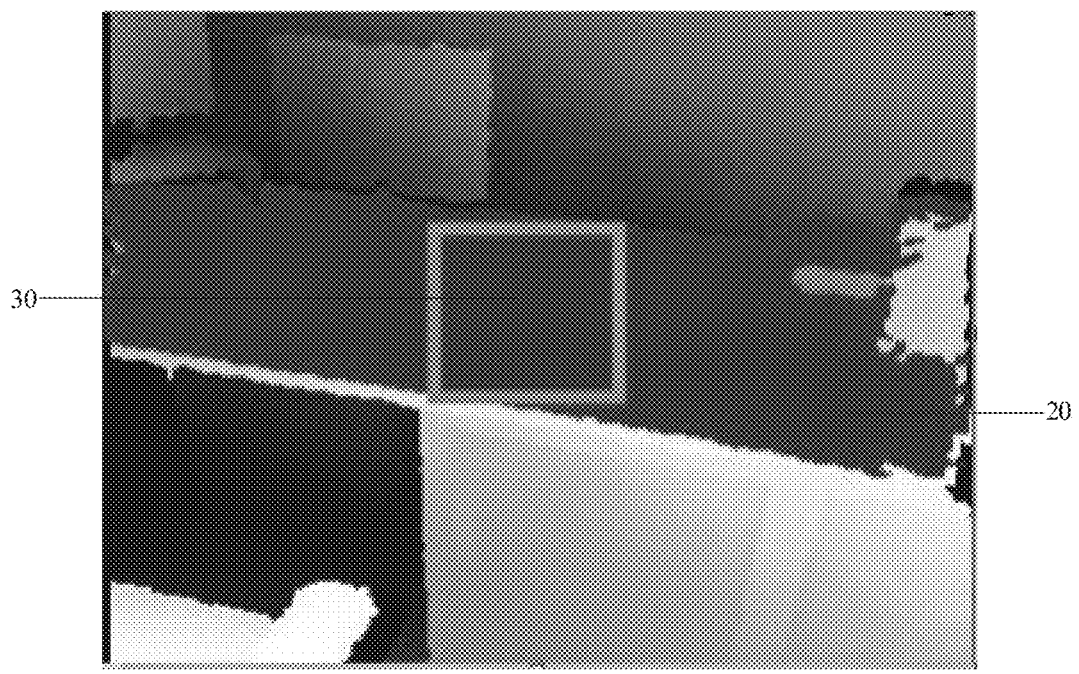
FIG. 6 is a schematic diagram of a maximum inscribed square provided by the first embodiment of the present invention.

In the datum plane, at least three points are selected to position the datum plane. In the embodiment, four points are obtained by way of depicting a maximum inscribed square of the datum plane. The maximum inscribed square of the contour of the datum plane may be obtained by depicting one small square at the center of the contour and then gradually enlarging the square until the square comes into contact with the contour. FIG. 6 is a schematic diagram of the maximum inscribed square provided by the first embodiment of the present invention. As shown in FIG. 6, coordinates of four vertices of the square 30 are set, and a datum coordinate system is built by taking the datum plane 20 (i.e., the planar graph 10) as the horizontal plane. The datum coordinate system includes a first axis, a second axis and a third axis, which are perpendicular to one another. The first axis is perpendicular to the datum plane, and the second axis and the third axis are arranged in the datum plane. With the above coordinate system, coordinates of every pixel point in the depth image can be determined, and therefore, a proper position can be chosen for a virtual object based on position of every real object in the pre-known environment to perform virtual-real fusion. Therefore, the technical solutions provided by the embodiment can easily match the virtual object with the real scene in real time, improve users' sensory experience beyond reality, and be applicable to portable devices such as a wearable lens, etc.

Referring to FIG. 6, the maximum inscribed square of the planar graph of the desk top obtained by depicting one small square at the center of the contour and then gradually enlarging the square until the square comes into contact with the contour is substantially located in the center of the desk top. The datum coordination system is formed based on coordinates of at least three points on the square 30. In a case where a virtual notebook computer needs to be modeled, the virtual notebook computer may be placed at the central of the desk top based on the datum coordinate system. Therefore, a plane formed by coordinate points on the bottom of the virtual notebook computer is made to coincide with the square 30. If other virtual object(s) needs to be added, the virtual object(s) may be added in turn on the datum plane 20 (e.g., near the center of the datum plane 20).

In the embodiment, before the step of forming a datum coordinate system based on the datum plane, the method may further include: selecting from the planar graphs in the edge image to determine a reference plane, the reference plane being parallel to the datum plane; and the step of forming a datum coordinate system based on the datum plane further includes: forming the datum coordinate system based on the datum plane and the reference plane, an origin of the datum coordinate system being in the reference plane.

In the embodiment, a calculating speed for each frame is within 30 ms, and therefore, plane detection can be performed in real time. However, once the datum plane is chosen, large change in viewing angle is not allowed after the virtual object and the real scene are fused based on the datum plane, or the virtual object cannot be placed accurately. The above method for determining a datum plane allows accurate determination of the datum plane, but once there is a change in user's line of sight, the condition in which the datum plane appears in the visual field changes, and position of the central point of the datum plane changes accordingly. It is assumed that a virtual notebook computer is placed at the position indicated by the square before, and once user's visual filed changes, the position of the notebook computer changes accordingly. Although the notebook computer is still on the previous datum plane, its specific position in physical space alters, which greatly influences users' subjective feeling and experience.

Figure 7:
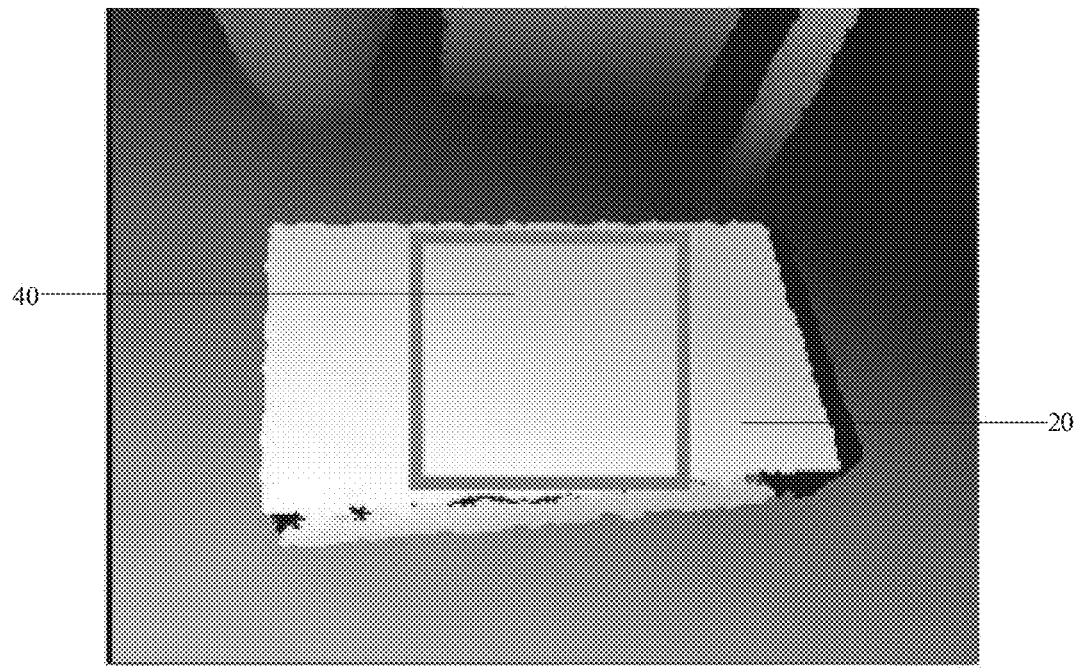
FIG. 7 is a schematic diagram of a reference plane provided by the first embodiment of the present invention.

Therefore, to solve the above problem, a reference plane may be additionally provided. FIG. 7 is a schematic diagram of a reference plane provided by the first embodiment of the present invention. As shown in FIG. 7, a reference such as a box, a book, or the like, pre-placed on the desk top is detected, and the planar graph of the detected reference is determined as the reference plane 40. A method for determining the reference plane 40 may be similar to the above-described method for determining a datum plane. For example, a proper planar graph may be obtained according to the image depth value. In addition, because an object such as a book is generally chosen as the reference, the planar graph thereof usually has a relatively small area. In this case, for example, the planar graph may be selected by setting a threshold value which is smaller than 15% of the area of the edge image or even smaller, so as to obtain the reference plane. The reference plane 40 may be parallel to the datum plane 20.

Subsequently, the datum coordinate system is built based on the datum plane 20 and the reference plane 40. The origin of the datum coordinate system may be arranged in the reference plane 40. With reference to the reference plane 40, a position where each virtual object is placed relative to the reference can be determined on the datum plane 20, and then the virtual object and the real scene are fused. Since the reference plane 40 is fixed, and the origin of the datum coordinate system is arranged within the reference plane 40, certain rotation of user's viewing angle can be allowed. The reference plane 40 can serve as the calibrated reference as long as it always appears in the visual field fully, thereby avoiding disorder of position of other virtual object.

The method for determining a datum plane provided by the embodiment includes: acquiring a depth image; performing edge extraction on the depth image to form an edge image, the edge image including a plurality of planar graphs; and selecting from the planar graphs in the edge image to determine the datum plane. The technical solutions provided by the embodiment can determine a datum plane in the real scene, so that a virtual coordinate system is built based on the datum plane, and eventually, the purpose of fusing a virtual object with a real scene is achieved. Therefore, the technical solutions provided by the embodiment can easily match the virtual object with the real scene in real time, improve users' sensory experience beyond reality, and be applicable to portable devices such as a wearable lens, etc.

Second Embodiment

Figure 8:
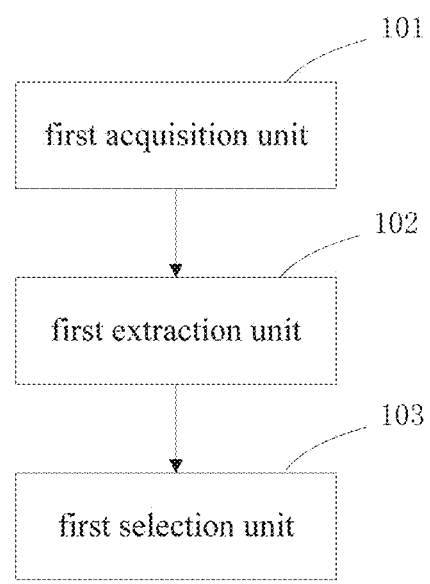
FIG. 8 is a schematic functional block diagram of a system for determining a datum plane provided by a second embodiment of the present invention.

FIG. 8 is a schematic diagram of a system for determining a datum plane provided by a second embodiment of the present invention. As shown in FIG. 8, the system for determining a datum plane includes: a first acquisition unit 101, which is configured to acquire a depth image; a first extraction unit 102, which is configured to extract an edge of the depth image to form an edge image, the edge image including a plurality of planar graphs; and a first selection unit 103, which is configured to select from the planar graphs in the edge image to determine the datum plane.

Referring to FIG. 2, the first acquisition unit 101 acquires the depth image of an office, in the embodiment, the first acquisition unit 101 may be a depth camera, and further, the depth image in the embodiment may also be referred to as depth of field image. In the embodiment, the first extraction unit 102 includes: a first acquisition module configured to obtain a gradient change rate of the depth image according to a preset gradient algorithm; a first formation module configured to form a binary image according to the gradient change rate; and a first extraction module configured to perform edge extraction on the binary image to form the edge image.

Unlike a binary image, edge extraction cannot be performed on a depth image. Therefore, in the embodiment, a depth image is first transformed into a binary image, as shown in FIG. 3, and then edge extraction is performed on the binary image to form an edge image. The binary image refers to an image in which every pixel has only two possible values or gray levels. In a depth image, gradient change of an edge of one plane in a viewing direction is uniform. Therefore, the first acquisition module calculates the gradient change rate of the depth image according to a preset gradient algorithm such as Sobel algorithm, and the first formation module sets pixels having a same gradient change rate to black and sets pixels having non-uniform gradient change rates to white, thereby forming a binary image.

Pixels having a same gradient change rate can be connected to form the edge of a plane, and therefore, the first extraction module can perform edge extraction on the binary image to form the edge image, as shown in FIG. 4. The edge image includes a plurality of planar graphs. For example, the planar graph 10 in the middle is formed by an edge contour of a table top.

Figure 9:
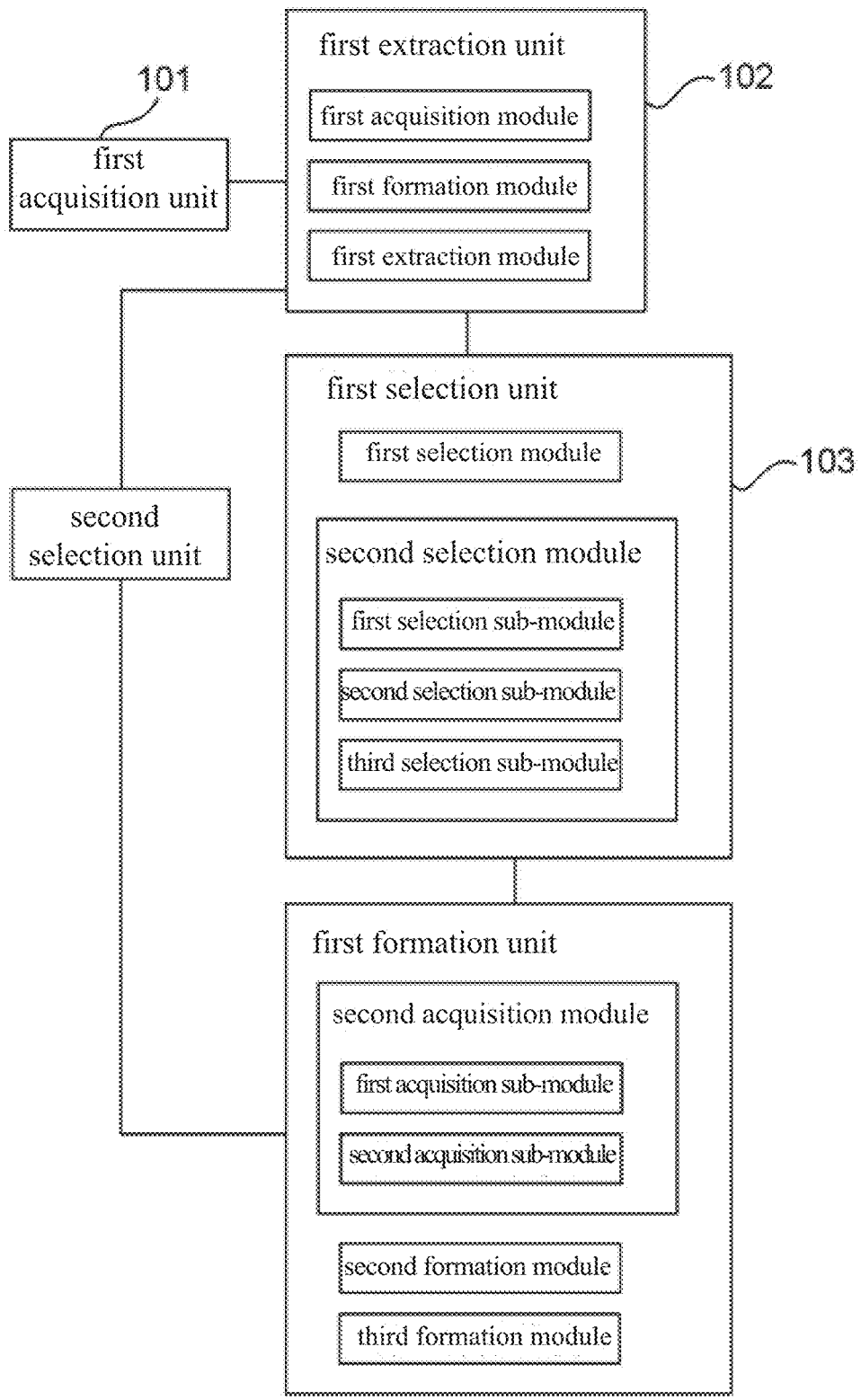
FIG. 9 is a schematic functional block diagram of an example of a system for determining a datum plane provided by the second embodiment of the present invention.

An example of the system for determining a datum plane provided by the second embodiment of the present invention will be described in detail below with reference to FIG. 9. As shown in FIG. 9, the first selection unit includes: a first selection module configured to select planar graphs each having an image depth value decreasing gradually from bottom to top to form a first planar graph collection; and a second selection module configured to select from the planar graphs in the first planar graph collection to determine the datum plane. Referring to FIG. 5, as described above, in the embodiment, the gradient change of a horizontal planar graph decreases gradually from bottom to top in the image (depth value in a user's viewing direction decreases gradually from near to far), for example, the depth value of the desk top in the user's viewing direction evenly decreases from near to far, thereby forming the planar graph 10. In the embodiment, by using the gradient change rate of a plane, a plane whose change trend does not satisfy the above requirement, such as a part of ceiling, and a side surface of the desk, can be excluded.

In the embodiment, the largest horizontal plane is chosen as the datum plane for projecting a virtual object. Optionally, the second selection module includes: a first selection sub-module, which is configured to select planar graphs each having an area larger than 15% of an area of the entire edge image to form a second planar graph collection; and a second selection sub-module, which is configured to select from the planar graphs in the second planar graph collection to determine the datum plane. By selecting, as the datum plane, a planar graph whose area is larger than 15% of the area of the entire image, a planar graph having a too small area can be excluded. For example, the planar graph 10 of the table top has an area larger than 15% of the area of the entire image, and therefore, the planar graph 10 of the table top is selected as the datum plane.

Preferably, the second selection sub-module includes a third selection sub-module, which is configured to select, from the second planar graph collection, a planar graph whose center point is closest to the bottom of the edge image to be the datum plane. In a case where a plurality of planar graphs satisfy the above conditions, the third selection sub-module may select, from these planar graphs, the planar graph whose edge contour has a central point proximal to the bottom of the entire image in the user's viewing direction. In this way, parts of ceiling and wall can be excluded. For example, in the embodiment, the planar graph 10 is selected as the datum plane 20.

In the embodiment, the system for determining a datum plane further includes a first formation unit, which is configured to form a datum coordinate system based on the datum plane. Optionally, the datum coordinate system includes a first axis, a second axis and a third axis, which are perpendicular to one another, and the first formation unit includes: a second acquisition module configured to obtain coordinates of at least three points in the datum plane; and a second formation module configured to form the datum coordinate system based on the coordinates of the at least three points, such that the first axis is perpendicular to the datum plane, and the second axis and the third axis are in the datum plane. Preferably, the second acquisition module includes: a first acquisition sub-module configured to obtain a maximum square in the datum plane; and a second acquisition sub-module configured to obtain coordinates of four vertices of the maximum square.

In the datum plane, at least three points are selected to position the datum plane. In the embodiment, four points are obtained by way of depicting a maximum inscribed square of the datum plane. The maximum inscribed square of the contour of the datum plane may be obtained by depicting one small square at the center of the contour and then gradually enlarging the square until the square comes into contact with the contour. Referring to FIG. 6, coordinates of the four vertices of the square 30 are set, and a datum coordinate system is built by taking the datum plane 20 (i.e., the planar graph 10) as the horizontal plane. The datum coordinate system includes a first axis, a second axis and a third axis, which are perpendicular to one another. The first axis is perpendicular to the datum plane, and the second axis and the third axis are arranged in the datum plane. With the above coordinate system, coordinates of every pixel point in the depth image can be determined, and therefore, a proper position can be chosen for a virtual object based on position of every real object in the pre-known environment to perform virtual-real fusion. Therefore, the technical solutions provided by the embodiment can easily match the virtual object with the real scene in real time, improve users' sensory experience beyond reality, and be applicable to portable devices such as a wearable lens, etc.

Referring to FIG. 6, the maximum inscribed square of the planar graph of the desk top obtained by depicting one small square at the center of the contour and then gradually enlarging the square until the square comes into contact with the contour is substantially located in the center of the desk top. The datum coordination system is formed based on coordinates of at least three points on the square 30. In a case where a virtual notebook computer needs to be modeled, the virtual notebook computer can be placed at the central of the desk top based on the datum coordinate system. Therefore, a plane formed by coordinate points of the bottom of the virtual notebook computer is made to coincide with the square 30. If other virtual object(s) needs to be added, the virtual object(s) may be added in turn on the datum plane 20 (e.g., near the center of the datum plane 20).

In the embodiment, a calculating speed for each frame is within 30 ms, and therefore, plane detection can be performed in real time. However, once the datum plane is chosen, large change in viewing angle is not allowed after the virtual object and the real scene are fused based on the datum plane, or the virtual object cannot be placed accurately. The above method for determining a datum plane allows accurate determination of the datum plane, but once there is a change in user's line of sight, the condition in which the datum plane appears in the visual field changes, and position of the central point of the datum plane changes accordingly. It is assumed that a virtual notebook computer is placed at the position indicated by the square before, and once user's visual filed changes, the position of the notebook computer changes accordingly. Although the notebook computer is still on the previous datum plane, its specific position in physical space alters, which greatly influences users' subjective feeling and experience.

Therefore, to solve the above problem, a reference plane may be additionally provided. In the embodiment, the system for determining a datum plane may further include: a second selection unit configured to select from the planar graphs in the edge image to determine a reference plane parallel to the datum plane; and the first formation unit may further include: a third formation module configured to form, based on the datum plane and the reference plane, the datum coordinate system whose origin is within the reference plane.

Referring to FIG. 7, a reference such as a box, a book, or the like, pre-placed on the desk top is detected, and the planar graph of the reference is determined as the reference plane 40. A method for determining the reference plane 40 may be similar to the above-described method for determining a datum plane. For example, a proper planar graph may be obtained according to the image depth value. In addition, because an object like a book is generally chosen as the reference, the planar graph thereof usually has a relatively small area. In this case, for example, the planar graph may be selected by setting a threshold value which is smaller than 15% of the area of the edge image or even smaller, so as to obtain the reference plane. The reference plane 40 may be parallel to the datum plane 20.

Subsequently, the datum coordinate system is built based on the datum plane 20 and the reference plane 40. The origin of the datum coordinate system may be arranged within the reference plane 40. With reference to the reference plane 40, a position where each virtual object is placed relative to the reference can be determined on the datum plane 20, and then the virtual object and the real scene are fused. Since the reference plane 40 is fixed, and the origin of the datum coordinate system is arranged within the reference plane 40, certain rotation of user's viewing angle can be allowed. The reference plane 40 can serve as the calibrated reference as long as it always appears in the visual field fully, thereby avoiding disorder of position of other virtual object.

The system for determining a datum plane provided by the embodiment includes: a first acquisition unit configured to acquire a depth image; a first extraction unit configured to extract an edge of the depth image to form an edge image including a plurality of planar graphs; and a first selection unit configured to select from the planar graphs in the edge image to determine the datum plane. The technical solutions provided by the embodiment can determine a datum plane in the real scene, so that a virtual coordinate system is built based on the datum plane, and eventually, the purpose of fusing a virtual object with a real scene is achieved. Therefore, the technical solutions provided by the embodiment can easily match the virtual object with the real scene in real time, improve users' sensory experience beyond reality, and be applicable to portable devices such as a wearable lens, etc.

It could be understood that, the above implementations are exemplary implementations merely used to describe the principle of the present invention, but the present invention is not limited thereto. Various components mentioned in various embodiments may be combined arbitrarily or one or more components may be omitted without confliction. For a person of ordinary skill in the art, various variations and improvements may be made without departing from the spirit and essence of the present invention, and those variations and improvements should also be regarded as falling into the protection scope of the present invention.

The invention claimed is:

1. A method for determining a datum plane, comprising:
   acquiring a depth image;
   performing edge extraction on the depth image to form an edge image, the edge image comprising a plurality of planar graphs; and
   selecting from the planar graphs in the edge image to determine the datum plane,
   wherein the step of performing edge extraction on the depth image to form an edge image comprises:
   obtaining a gradient change rate of the depth image according to a preset gradient algorithm;
   forming a binary image according to the gradient change rate; and
   performing edge extraction on the binary image to form the edge image.

2. The method for determining a datum plane according to claim 1, further comprising, after the step of selecting from the planar graphs in the edge image to determine the datum plane, a step of:
   forming a datum coordinate system based on the datum plane.

3. The method for determining a datum plane according to claim 1, wherein the step of selecting from the planar graphs in the edge image to determine the datum plane comprises:
   selecting planar graphs each having an image depth value decreasing gradually from bottom to top to form a first planar graph collection; and
   selecting from the planar graphs in the first planar graph collection to determine the datum plane.

4. The method for determining a datum plane according to claim 3, wherein the step of selecting from the planar graphs in the first planar graph collection to determine the datum plane comprises:
   selecting planar graphs each having an area larger than 15% of an area of the edge image to form a second planar graph collection; and
   selecting from the planar graphs in the second planar graph collection to determine the datum plane.

5. The method for determining a datum plane according to claim 4, wherein the step of selecting from the planar graphs in the second planar graph collection to determine the datum plane comprises:
   selecting, from the second planar graph collection, a planar graph whose center point is closest to the bottom of the edge image to be the datum plane.

6. The method for determining a datum plane according to claim 2, wherein the datum coordinate system comprises a first axis, a second axis and a third axis perpendicular to one another, and the step of forming a datum coordinate system based on the datum plane comprises:
   obtaining coordinates of at least three points in the datum plane; and
   forming the datum coordinate system based on the coordinates of the at least three points such that the first axis is perpendicular to the datum plane, and the second axis and the third axis are in the datum plane.

7. The method for determining a datum plane according to claim 6, wherein the step of obtaining coordinates of at least three points in the datum plane comprises:
   obtaining a maximum square in the datum plane; and
   obtaining coordinates of four vertices of the maximum square.

8. The method for determining a datum plane according to claim 2, further comprising, before the step of forming a datum coordinate system based on the datum plane, a step of:
   selecting from the planar graphs in the edge image to determine a reference plane, the reference plane being parallel to the datum plane; and
   wherein the step of forming a datum coordinate system based on the datum plane comprises:
   forming the datum coordinate system based on the datum plane and the reference plane such that an origin of the datum coordinate system is in the reference plane.

* * * * *